Jan. 22, 1946.   L. EDELMANN   2,393,522
THERMOHYDROMETER
Filed July 2, 1943   2 Sheets-Sheet 1
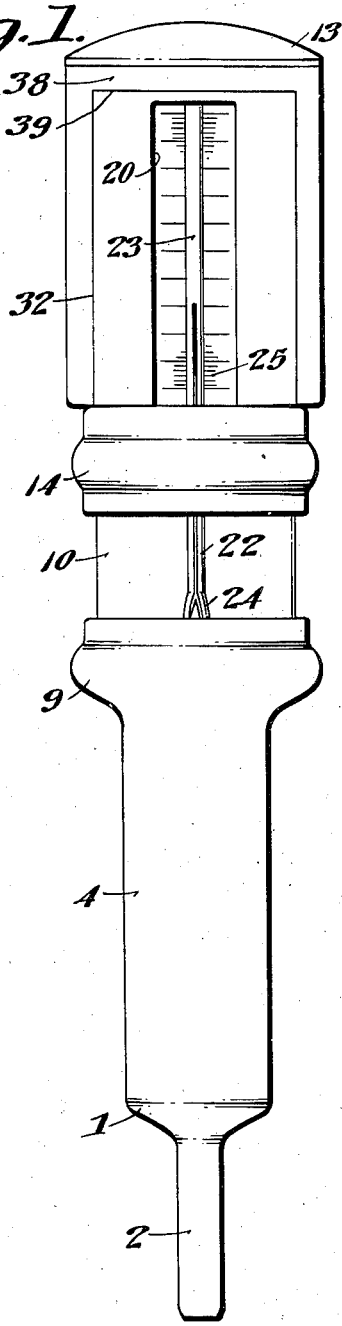
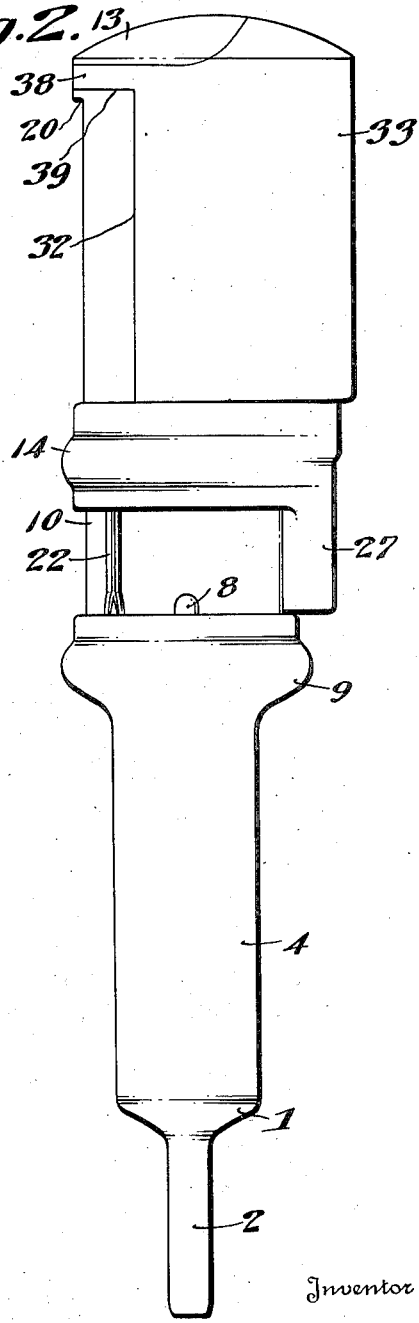
Inventor
Leo Edelmann
By Lloyd W. Patch
Attorney Jan. 22, 1946.　　　L. EDELMANN　　　2,393,522
THERMOHYDROMETER
Filed July 2, 1943　　　2 Sheets-Sheet 2

Inventor
Leo Edelmann
By Lloyd W. Patek
Attorney

Patented Jan. 22, 1946

2,393,522

UNITED STATES PATENT OFFICE 2,393,522

THERMOHYDROMETER

Leo Edelmann, Chicago, Ill.

Application July 2, 1943, Serial No. 493,263

7 Claims. (Cl. 73—34)

My invention relates to improvements in thermohydrometers, and particularly to an instrument of this type adapted to give readings or indications at a constant level of the liquid being tested.

The primary purpose of my invention is to provide a syringe thermohydrometer of the type ordinarily held in the hand and used for testing anti-freeze and battery solutions and the like, which instrument is of such construction that a substantially constant level of liquid is attained for the specific gravity float element, in each instance of use and irrespective of the particular degree of compression and the force applied to the suction bulb, and which at the same time insures that the temperature influenced portions will be subjected to the test quantity of liquid solution.

Another object is to provide an instrument of this character that can be made relatively short and compact and which will at the same time permit use of a proportionately long float element.

Still another purpose is to provide an instrument of this character in which the float element is entirely housed and shielded and protected and with which all exposed parts are of material not readily frangible or likely to be damaged in ordinary use.

Still another object is to so construct the instrument that the parts thereof readily adapt themselves to molding and other commercial production operations tending toward accurate construction and sizing and rapid and inexpensive manufacture.

A further object is to provide a thermohydrometer in which the barrel or housing portion for the float element extends upwardly beyond the usual construction limits to be substantially embraced within a portion of the suction bulb and with which the thermometer or temperature indicating means is also substantially protected by the adjacent housing and bulb portions.

With the above and other objects in view, some of which will be apparent to those skilled in the art and others of which are inherent in the construction and use of the instrument, my invention includes certain novel features of construction and combinations and arrangements and associations of parts which will be hereinafter set forth in connection with the drawings and then pointed out in the claims.

In the drawings:

Figure 1 is a view in front elevation showing a thermohydrometer embodying my invention.

Fig. 2 is a view in side elevation.

Figure 3:
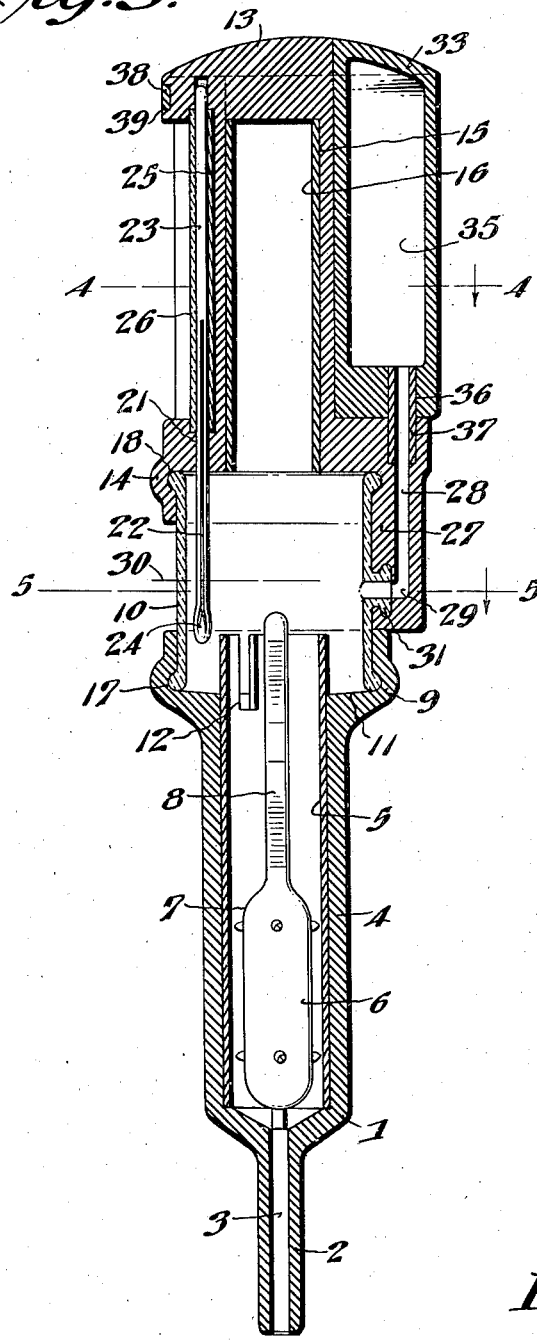
Fig. 3 is a vertical sectional view.
Figure 4:
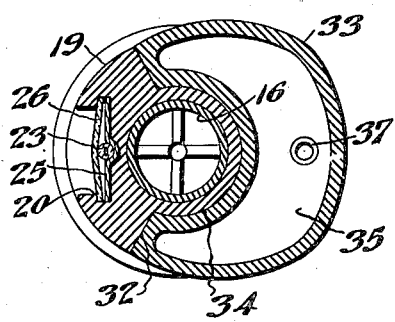
Fig. 4 is a transvere sectional view substantially on line 4—4 of Fig. 3, with the float omitted.
Figure 5:
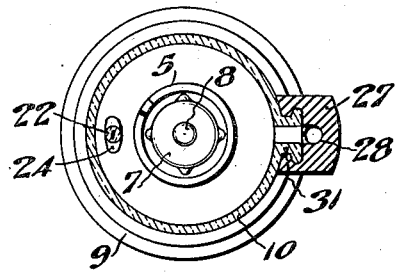
Fig. 5 is a sectional view on line 5—5 of Fig. 3.

A nozzle member 1 has at one end thereof a nozzle tip 2 provided with a liquid passage 3, and the nozzle member is increased in diameter at its other end to provide a housing portion 4, which housing portion is preferably reinforced by a liner insert sleeve 5 of sufficient internal diameter to clear the bulb portion 6 of the float element 7 having an indicating stem 8 extending upwardly thereon. The nozzle tip 2 and housing portion 4 can be conveniently made of soft or cushion rubber, and the rigid sleeve 5 can be a hard rubber insert, and the housing portion 4 is preferably made of sufficient length to accommodate and house and protect a substantial portion of the float element 7. At its upper end 1 is provided with a mounting sleeve portion 9 to receive the lower end of a transparent liquid barrel 10. In the present instance I have shown the insert sleeve 5 as extending above the shoulder 11, where the housing portion 4 is widening out into the connecting sleeve portion 9, and for drainage the extending upper end of the sleeve 5 can be slotted, as at 12, so that liquid will not be trapped and retained in the space above the shoulder 11.

The transparent liquid barrel 10 is preferably made of considerably less length and of greater diameter than is customary in the proportioning of liquid barrels for hydrometers, and this liquid barrel can be conveniently made of a transparent moldable material, such as "lucite," or other moldable material, as well as glass or other transparent material, molded or blown or otherwise formed.

An upper housing member 13, which can also be of soft or cushion rubber, is provided with a connecting sleeve 14 bearing and connecting upon the upper end of the transparent liquid barrel 10, and this housing member 13 has a housing opening 15 therein substantially axially aligned with the housing opening of the nozzle member 1. A tubular liner 16, of hard rubber or other suitable substantially rigid material, can be inserted or molded or vulcanized in the opening 15. By employment of the linings 5 and 16 within the lower nozzle portion 1 and the upper housing portion 13, a long housing is provided communicating with the upper and lower ends of the transparent barrel 10, so that the float bulb 7 can have a considerable length of movement up and down in a range to be viewed through the transparent liquid barrel 10, and at the same time the transparent barrel 10 need be made only sufficiently long to permit a view of the indicating stem 8 of the float barrel 7 at the level of a test quantity of liquid solution as taken up by the thermohydrometer instrument. Since the nozzle 1 and the housing 13 are of soft or cushion rubber, or of other cushion material, the upper and lower ends of the stem and the float bulb portions 8 and 6 of the float element 7 will be protected and cushioned against shocks as the float element may move from one end to the other through the length of the axially aligned housing sleeves 5 and 16.

In the present instance I have shown the transparent housing 10 as provided with annularly outstanding bead-like portions 17 and 18 at its lower and upper ends received and holding in liquid-tight fitting within correspondingly shaped grooves within the connecting sleeve portions 9 and 14, and it will of course be understood that these parts can be made and connected in any desired or suitable manner.

The upper housing member 13 is enlarged or thickened on one side, as at 19, and is then recessed or grooved, as at 20, in a direction substantially corresponding with the axial line of the housing opening 15. An opening 21 is provided through the upper part of the connecting sleeve portion 14 of the housing member 13, substantially axially aligned in the recess 20, and a tube thermometer 22 has the indicating portion or tube 23 thereof received through this opening so that this portion 23 lies within the recess 20, while the bulb or temperature influenced portion 24 of the thermometer 22 is disposed and is held sufficiently low down in the transparent liquid barrel 10 that it will be below the constant level of a test quantity of liquid, which constant level will be established in a manner and by structure to be hereinafter more fully described. A gauge or scale or indicating sheet 25 can be placed in the recess 20 back of or adjacent to the indicating tube portion 23 of the thermometer 22, and if desired a protective covering 26, of transparent plastic or of other suitable material may be mounted and held in the recess over and in protecting relation with respect to the indicating portion or tube 23 of the thermometer 22.

At a location preferably opposite to or spaced away from the location of the opening 21 for the thermometer 22, the housing member 13 has a tubular depending connecting tube 27, which connecting tube is provided with a substantially L-shaped suction and liquid passage 28 opening inwardly in the branch 29 near the lower end of the tubular extension 27.

The liquid level desired to be attained and maintained within the transparent liquid barrel 10 will be substantially as indicated by the line at 30, and the liquid barrel 10 has a laterally extending connecting nipple 31 opening substantially at this level, as best shown in Fig. 3. The connecting nipple 31 and the open end of the L-shaped portion 29 of the passage 28 of the tubular extension 27 are correspondingly shaped so that the tubular extension can be joined in liquid and fluid tight connection with this connecting nipple 31.

The housing portion 13 is preferably made of only sufficient size to provide structural strength for the housing opening 15 throughout the side of the housing away from the enlargement or projection at 19 and the enlargement is preferably terminated in shoulders 32. A suction bulb 33 is recessed on one side, as at 34, to fit upon or around the portion of the housing 13 above the connecting sleeve portion 14 and between the shoulders 32, and the suction bulb has the effective opening 35 thereof of somewhat crescent shape with the outer wall rounding out so that a considerable capacity is provided within the opening or chamber 35. The suction bulb 33 is of cushion rubber or of other suitable material, blown, molded, or otherwise shaped to the desired form, and this suction bulb has an opening 36 through the bottom wall thereof substantially aligned with the opening 28 of the depending tubular portion 27. A connecting nipple or sleeve 37, of hard rubber or other suitable material, is fitted in the aligned openings 36 and 28, and in consequence the interior opening 35 of the suction bulb 33 is connected with the nipple 31 and consequently with the interior of the transparent liquid barrel 10.

It may be found desirable to provide the bulb 33 with an annular band 38 extending forwardly of the recess 34 and stretched to fit within a recess or groove 39 in the extending or projecting portion 19 of the housing 13, so that the bulb 33 will be positively and intimately retained in the desired fitting and position with respect to the housing 13.

The portion 25 can have thereon temperature degree indications or any other desired markings or scales or other indications, and the stem 8 of the float element 7 can be graduated or marked or provided with scales or indications, in any desired manner, for the particular liquid solution with which the instrument is to be used. The instrument can be provided with correction scale or other data and can have any special matter or indications to coordinate the temperature and specific gravity readings or indications.

In the use of this instrument, the nozzle tip portion 2 is immersed in the liquid solution from which a test quantity is to be taken, and as the bulb 33 is squeezed this bulb will be compressed on its outer sides around the upper housing portion 13 so that when the pressure on the bulb 33 is released liquid will be sucked through the passage 3 and up into the housing portion 4 of the nozzle member 1. The capacity of the bulb 33 is such that under ordinary compression and suction a quantity of liquid will be drawn in sufficient to rise well within the transparent barrel 10, and above the desired liquid level line at 30; and, as the liquid reaches this fixed level line at 30 excess liquid will be drawn or sucked through the connecting nipple 31 and the passages 29 and 28 to be drawn up into these passages and in excess quantities up into the opening 35 of the bulb 33 so that the liquid level will not rise above the desired constant level as indicated at 30. The bulb or temperature influenced portion 24 of the thermometer 22 is placed well down below the passage through nipple 31, and consequently that portion of the thermometer directly influenced by the temperature of the test quantity of liquid will be submerged within the liquid solution substantially as this is affecting the float element 7. Where a constant level is thus accomplished, it is possible to make the barrel 10 very short and the only part necessarily exposed is a short area substantially at the line 30, so that the length of the barrel 10 can consequently be very much shortened over what has heretofore been accepted as the minimum length possible. When the instrument is to be emptied, bulb 33 is again squeezed or depressed and the liquid will be forced out through the passage 3 of the nozzzle tip 2, the opening or notch at 12 permitting complete draining of the liquid barrel.

While I have herein referred to certain parts as being made of soft or cushion rubber, and to other parts as being of hard or vulcanized rubber, it will be understood and appreciated that the word rubber is used only in a descriptive sense as indicating that the parts are preferably made of material possessing some of the properties or characteristics of rubber; and, other materials such as synthetic rubber substitutes, plastics, and the like, may be employed.

While I have herein shown and described only certain specific embodiments of my invention and have set forth only certain possible materials from which the parts are made, it will be appreciated that many changes and variations can be made in the form and construction and arrangement and association of the parts, in the materials employed in the construction thereof, and in the manner of use, without departing from the spirit and scope of my invention.

I claim:

1. A hydrometer having lower housing and nozzel and upper housing portions with a transparent liquid barrel portion intermediate, a float element movable in the housing structure and viewable through the transparent portion, and said liquid barrel portion having an opening through the side thereof, and a suction bulb substantially eccentrically encircling one side of the upper housing portion and compressible thereagainst, the suction bulb having a connection with the opening of the barrel portion to draw a test quantity of liquid into the lower housing portion and up into the transparent portion to a level for noting indications of the float element through said transparent portion.

2. A thermohydrometer comprising a short transparent liquid barrel portion, a nozzle member mounted at the lower end of said liquid barrel portion having a housing portion aligned therewith, an upper housing member connected at the upper end of the liquid barrel with the housing opening thereof substantially aligned with the opening of the liquid barrel and the housing opening of the nozzle member, a float element movable within the aligned portions and viewable through the transparent liquid barrel, said liquid barrel having a suction passage through the side thereof at a point substantially corresponding with a predetermined liquid level at which the indicating portion of the float element is to be read through the liquid barrel, and a suction bulb disposed and lying around one side of the upper housing portion and connected with the suction passage of the liquid barrel.

3. A thermohydrometer comprising a short transparent liquid barrel portion, a nozzle member mounted at the lower end of said liquid barrel portion having a housing portion aligned therewith, an upper housing member connected at the upper end of the liquid barrel with the housing opening thereof substantially aligned with the opening of the liquid barrel and the housing opening of the nozzle member, a float element movable within the aligned portions and viewable through the transparent liquid barrel, a thermometer having an indicating portion disposed and viewable along one side of the upper housing portion and having a temperature influenced portion extending within the liquid barrel to a point below the testing liquid level, and a suction bulb disposed and lying around the side of the upper housing portion away from the indicating portion of the thermometer and connected with the liquid barrel.

4. A thermohydrometer comprising a short transparent liquid barrel having a connecting nipple on one side with an opening therethrough communicating with the interior of the barrel, a nozzle member connected at the lower end of the barrel and provided with a float element housing opening substantially aligned with the opening of the barrel, a float element movably disposed in the housing opening and liquid barrel, an upper housing member connected at the upper end of the liquid barrel and having a housing opening substantially aligned with the lower housing opening to accommodate the upper end of the float element when in testing use, a tubular extension on said upper housing portion connected at its lower end with said nipple, a suction bulb lying around and substantially embracing one side of the upper housing portion, and a connection between said suction bulb and the tubular extension.

5. A thermohydrometer comprising a short transparent liquid barrel having a connecting nipple on one side with an opening therethrough communicating with the interior of the barrel, a nozzle member connected at the lower end of the barrel and provided with a float element housing opening substantially aligned with the opening of the barrel, a float element movably disposed in the housing opening and the liquid barrel, an upper housing member connected at the upper end of the liquid barrel and having a housing opening substantially aligned with the lower housing opening to accommodate the upper end of the float element when in testing use, a tubular extension on said upper housing portion connected at its lower end with said nipple, a suction bulb lying around and substantially embracing one side of the upper housing portion, a connection between said suction bulb and the tubular extension, and a thermometer carried by said upper housing portion away from the disposition of the suction bulb having an indicating portion alongside said housing portion and a temperature influenced portion extending into the liquid barrel to a point below the liquid passage through the connecting nipple thereof.

6. A thermohydrometer comprising a short transparent liquid barrel having a connecting nipple extending laterally at one side with an opening therethrough communicating with the interior of the barrel in its middle portion, a nozzle member connected at the lower end of the barrel and having a float element housing portion opening in substantial alignment with the opening of the barrel, an upper housing member connected at the upper end of the liquid barrel and having a housing opening substantially aligned with the lower housing opening, a float element movable within the liquid barrel and the aligned upper and lower housing openings, a suction bulb lying around and substantially embracing one side of the upper housing portion, and a connection from said suction bulb depending along one side of the housing and connected at the laterally extending nipple of the transparent barrel.

7. A thermohydrometer comprising a short transparent liquid barrel having a connecting nipple extending laterally at one side with an opening therethrough communicating with the interior of the barrel in its middle portion, a nozzle member connected at the lower end of the barrel and having a float element housing portion opening in substantial alignment with the opening of the barrel, an upper housing member connected at the upper end of the liquid barrel and having a housing opening substantially aligned with the lower housing opening, a float element movable within the liquid barrel and the aligned upper and lower housing openings, a suction bulb lying around and substantially embracing one side of the upper housing portion, a connection from said suction bulb depending along one side of the housing and connected at the laterally extending nipple of the transparent barrel, said upper housing member being provided with a recess in that portion away from the disposition of the suction bulb, and a thermometer having an indicating portion housed within the recess and having a temperature influenced portion extending into the transparent liquid barrel to a point below the opening of the laterally extending nipple.

LEO EDELMANN.